United States Patent
Ibrahim et al.

(10) Patent No.: US 9,062,474 B2
(45) Date of Patent: Jun. 23, 2015

(54) VEHICLE CARGO LID ASSEMBLY HAVING COMPACT REVERSIBLE HANDLE

(71) Applicant: Honda Motor Co., Ltd., Tokyo (JP)

(72) Inventors: Christina M. Ibrahim, Dublin, OH (US); Donald W. Jackson, West Mansfield, OH (US)

(73) Assignee: Honda Motor Co., Ltd., Tokyo (JP)

( * ) Notice: Subject to any disclaimer, the term of this patent is extended or adjusted under 35 U.S.C. 154(b) by 82 days.

(21) Appl. No.: 13/945,984

(22) Filed: Jul. 19, 2013

(65) Prior Publication Data

US 2015/0020455 A1 Jan. 22, 2015

(51) Int. Cl.
*E05B 85/10* (2014.01)
*E05B 7/00* (2006.01)
*B25G 1/04* (2006.01)
*E05C 21/00* (2006.01)
*E05B 5/00* (2006.01)

(52) U.S. Cl.
CPC ... *E05B 7/00* (2013.01); *B25G 1/04* (2013.01); *E05C 21/005* (2013.01); *E05B 5/006* (2013.01); *E05B 85/10* (2013.01)

(58) Field of Classification Search
CPC .......... E05B 7/00; E05B 5/006; E05B 85/10; B25G 1/04; E05C 21/005
USPC ............ 49/394, 395, 400–402; 292/137, 163, 292/165, 166, 170, 169, 173
See application file for complete search history.

(56) References Cited

U.S. PATENT DOCUMENTS

| | | | | |
|---|---|---|---|---|
| 2,497,624 A | * | 2/1950 | Nelson | 292/166 |
| 3,495,862 A | * | 2/1970 | McClintock | 292/173 |
| 3,758,140 A | * | 9/1973 | Prete, Jr. | 292/223 |
| 3,909,051 A | * | 9/1975 | Nakai | 292/166 |
| 5,080,417 A | * | 1/1992 | Kanai | 296/37.3 |
| 5,257,846 A | * | 11/1993 | Kanai et al. | 296/37.14 |
| 5,292,159 A | * | 3/1994 | Sandhu et al. | 292/173 |
| 6,460,902 B1 | * | 10/2002 | Kyle | 292/165 |
| 6,695,380 B1 | | 2/2004 | Hicks | |
| 6,719,332 B2 | * | 4/2004 | Sekulovic | 292/170 |
| 6,874,667 B2 | | 4/2005 | Dykstra et al. | |
| 6,890,015 B2 | * | 5/2005 | Carlsson et al. | 296/37.14 |
| 6,926,348 B2 | * | 8/2005 | Krueger et al. | 296/184.1 |
| 7,207,616 B2 | | 4/2007 | Sturt | |
| 7,503,610 B2 | | 3/2009 | Karagitz et al. | |
| 7,748,775 B2 | | 7/2010 | Mercurio | |
| 8,128,146 B2 | | 3/2012 | Sogame et al. | |
| 8,205,926 B2 | | 6/2012 | Beckley et al. | |
| 8,231,164 B2 | * | 7/2012 | Schubring et al. | 296/37.14 |
| 8,876,177 B2 | * | 11/2014 | Takada et al. | 292/336.3 |
| 2003/0090120 A1 | * | 5/2003 | Barber et al. | 296/37.5 |
| 2012/0272695 A1 | | 11/2012 | Pickar | |

* cited by examiner

*Primary Examiner* — Katherine Mitchell
*Assistant Examiner* — Marcus Menezes
(74) *Attorney, Agent, or Firm* — Rankin, Hill & Clark LLP

(57) ABSTRACT

A vehicle cargo lid assembly includes a reversible vehicle cargo lid, a plunger movably mounted to the cargo lid for movement between an extended position for latching the vehicle cargo lid in a closed position and a retracted position for unlatching the vehicle cargo lid, a first handle mounted on a first side of the cargo lid and a second handle mounted on a second, opposite side of the cargo lid. The first and second handles are arranged so that rotation of either handle moves the plunger from the extended position to the retracted position. At least one of the first handle and the second handle includes at least one tab laterally offset from a center line of the plunger that engages and moves the plunger when said at least one of the first side handle and the second side handle is rotated.

18 Claims, 6 Drawing Sheets

US 9,062,474 B2

VEHICLE CARGO LID ASSEMBLY HAVING COMPACT REVERSIBLE HANDLE

BACKGROUND

Conventional storage compartments are provided within vehicles for stowing a variety of items. Such storage compartments may be located/disposed within a load floor of a vehicle and include a closure panel that provides selective access to the storage compartment. It is known for the closure panel to be reversible (e.g., having a carpet surface on one side and a molded plastic surface on the opposite side). In some circumstances, the closure panel can include a latch mechanism, designed to move between an unlatched/unlocked state to a latched/locked state. It is known to provide actuators for the latch mechanism on both sides of the closure panel.

SUMMARY

According to one aspect, a cargo lid assembly for a vehicle includes a reversible vehicle cargo lid and a plunger movably mounted to the reversible vehicle cargo lid for movement between an extended position for latching the vehicle cargo lid in a closed position and a retracted position for unlatching the vehicle cargo lid. The cargo lid assembly further includes a first side handle mounted on a first side of the vehicle cargo lid and a second side handle mounted on a second, opposite side of the vehicle cargo lid. The first and second side handles are arranged so that rotation of either the first side handle or the second side handle moves the plunger from the extended position to the retracted position. At least one of the first side handle and the second side handle includes at least one tab laterally offset from a center line of the plunger that engages and moves the plunger when said at least one of the first side handle and the second side handle is rotated.

According to another aspect, the vehicle cargo lid assembly includes a cargo lid disposed in a floor aperture on a vehicle, wherein the cargo lid is reversible and removable; a plunger disposed on the cargo lid for securing the cargo lid within the floor aperture, wherein the plunger is moveable between an extended position and a retracted position; and first and second side handles disposed, respectively, on first and second sides of the cargo lid. The first and second handles are arranged so that rotation thereof moves the plunger from the extended position to the retracted position. The first side handle has a first handle tab laterally offset from a center line of the plunger for reducing an overall fitness of the vehicle cargo lid assembly.

According to a further aspect, a handle assembly for a vehicle cargo lid includes a plunger moveably mounted to a body for movement between an extended position and a retracted position, a first side handle mounted to the body and arranged so that rotation of the first side handle moves the plunger from the extended position toward the retracted position, a second side handle mounted to the body and arranged so that rotation of the second side handle moves the plunger from the extended position toward the retracted position, and at least one tab disposed on one of the first side handle and the second side handle. The at least one tab is laterally offset relative to a center line of the plunger and arranged to forcibly contact and move the plunger when said one of the first side handle and the second side handle is rotated.

DETAILED DESCRIPTION

Figure 1:
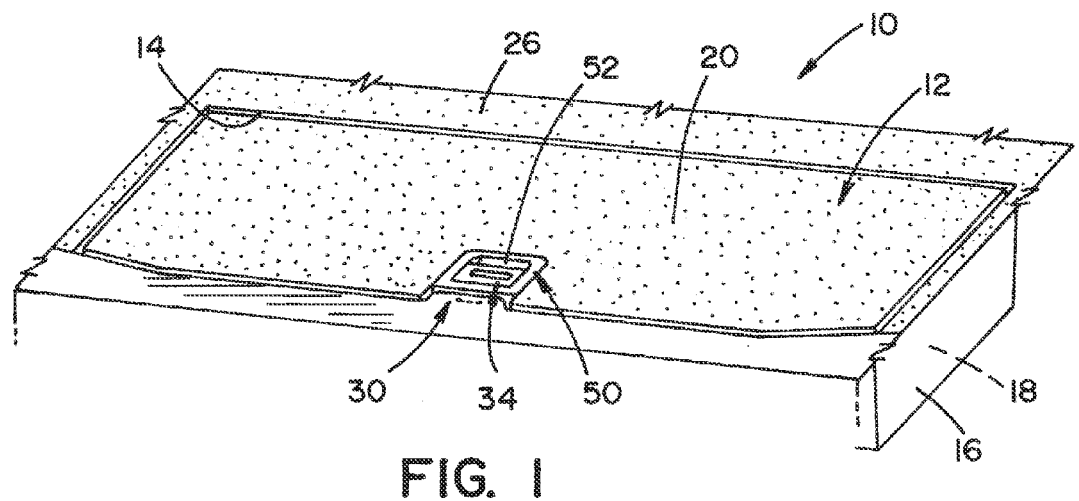
FIG. 1 is a perspective view of a vehicle cargo lid assembly according to an exemplary embodiment including a cargo lid reversibly and removeably mounted within a floor aperture on a vehicle.

Referring now to the drawings wherein the showings are for purposes of illustrating one or more exemplary embodiments and not for purposes of limiting same, FIG. 1 shows a cargo lid assembly for a vehicle generally indicated by reference numeral 10 and also referred to herein as a vehicle cargo lid assembly. The cargo lid assembly 10 includes a reversible vehicle cargo lid 12 disposed in a floor aperture 14 on a vehicle 16. In particular, the cargo lid 12 is reversible and removable. That is, the cargo lid 12 is reversibly and removeably disposed in the floor aperture 14 for providing access to a cargo compartment 18. As such, the cargo lid 12 can be fully removed from the floor aperture 14 and reinstalled in a reversed configuration as will be described in more detail below. As shown, the floor aperture 14 can be disposed within a floor 26 of the vehicle 16. In one embodiment, the floor 26 is a load floor disposed in a cargo area of the vehicle 16, such as behind rear seats (not shown) of the vehicle 16.

Figure 2:
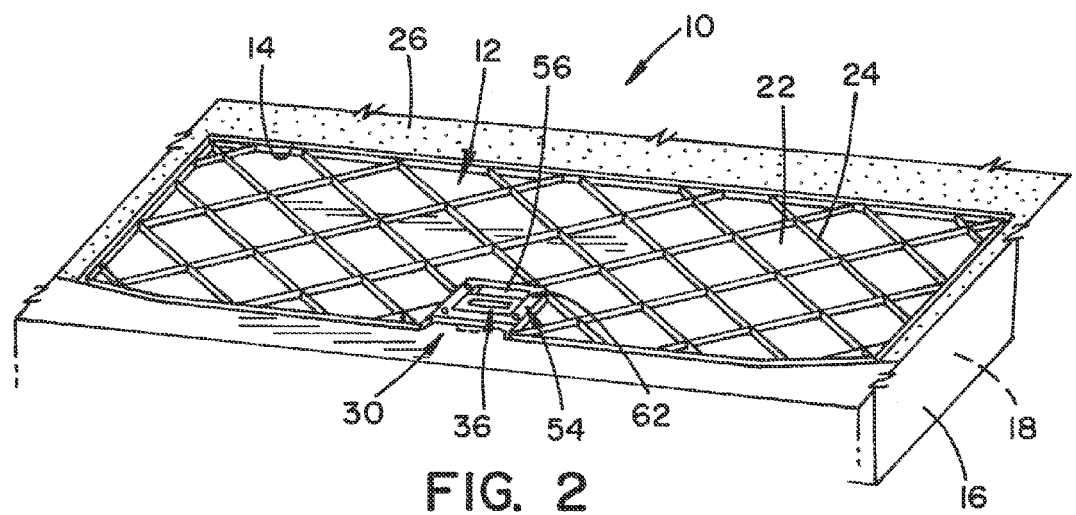
FIG. 2 is a perspective view similar to FIG. 1 but showing an opposite side of the cargo lid facing upward.
Figure 3:
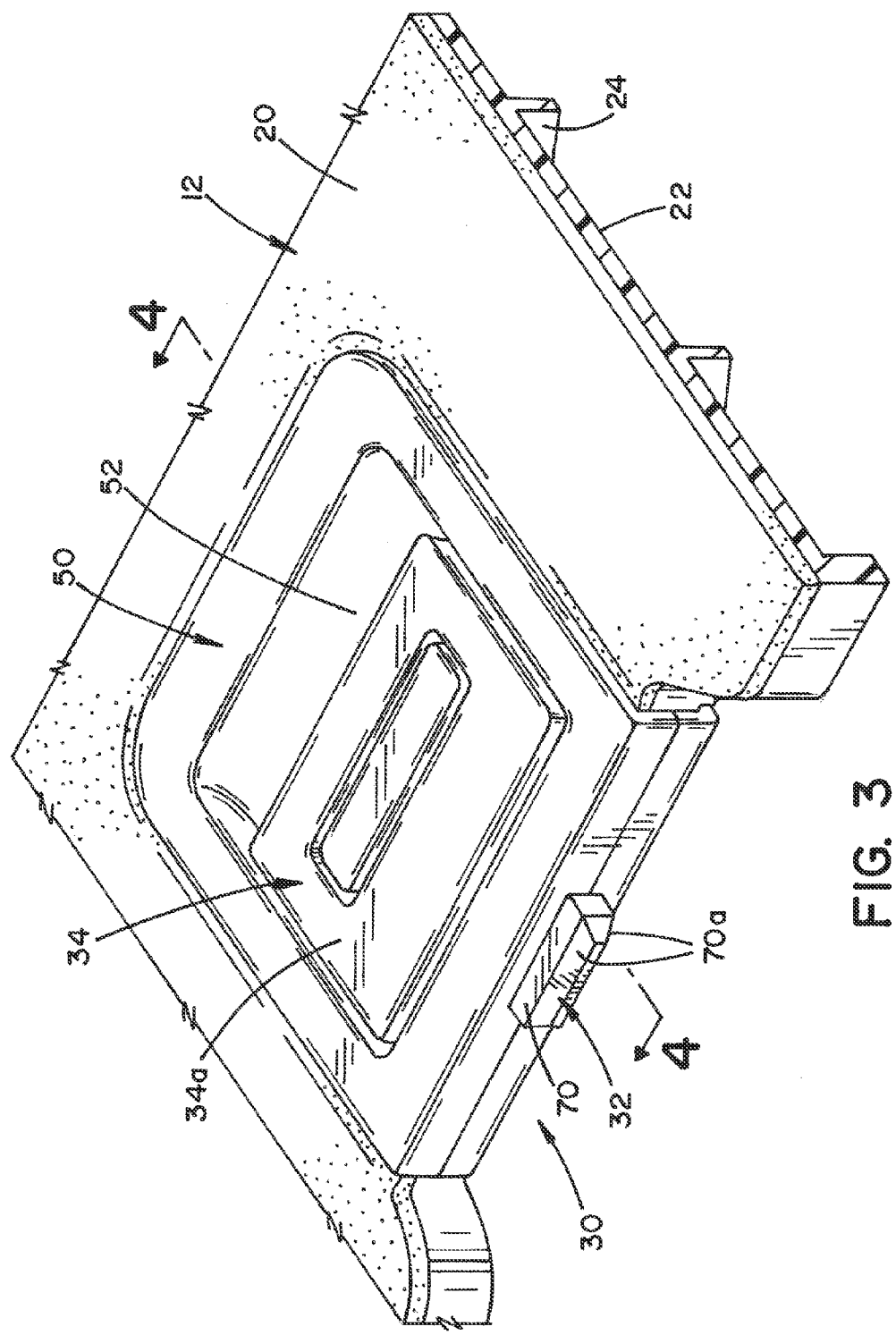
FIG. 3 is a partial perspective view of the cargo lid of FIG. 1 showing a handle assembly thereof.

More specifically, and with additional reference to FIG. 2, a first side 20 of the cargo lid 12 can be formed of a first material and a second side 22 of the cargo lid 12 can be formed of a second material that is different than the first material. FIG. 1 illustrates the cargo lid 12 with the first side 20 facing upward, whereas FIG. 2 illustrates the cargo lid 12 with the second side 22 facing upward. In the illustrated embodiment, the first material is carpeting so that the first side 20 when facing upward as shown in FIG. 1 presents a carpeted surface and the second material is plastic so that the second side 22 when facing upward as shown in FIG. 2 presents a plastic surface. In one embodiment, the second side 22 is injection molded of a plastic material and uses "I-pillar" construction to provide structural integrity to the cargo lid 12. Such construction employs a plurality of reinforcing members or ribs 24 and allows the cargo lid 12 to be of a lighter weight than a conventional blow molded closure. As will be described in more detail below, the cargo lid 12 includes a handle assembly 30 that is operable from inside the vehicle 16 (i.e., outside the cargo compartment 18) regardless of the side 20 or 22 that is facing upward.

With additional reference to FIGS. 3-7, the handle assembly 30 includes a plunger 32 moveably mounted to the cargo lid 12 for movement between an extended position (shown in FIGS. 3 and 4) for latching the cargo lid 12 in a closed position and a retracted position (shown in FIG. 5) for unlatching the cargo lid 12. Thus, the plunger 32 is disposed on the cargo lid 12 for securing the cargo lid 12 within the floor aperture 14. In particular, the plunger 32 moves between the extended position wherein the plunger 32 can latch the cargo lid 12 when the cargo lid 12 is disposed within the floor aperture 14 as shown in FIGS. 1 and 2 and the retracted position wherein the cargo lid 12 can be removed from the floor aperture 14 such as for storage or for reversing the cargo lid 12.

The handle assembly 30 further includes a first side handle 34 mounted on the first side 20 of the cargo lid 12 and a second side handle 36 mounted on the second side 22 of the cargo lid 12. Thus, the first and second side handles 34, 36 are disposed, respectively, on the first and second sides 20, 22 of the cargo lid 12. As will be described in more detail below, the first and second side handles, 34, 36 are arranged so that rotation of either the first side handle 34 or the second side handle 36 moves the plunger 32 from the extended position to the retracted position. Moreover, as will also be described in further detail below, at least one of the first side handle 34 and the second side handle 36 includes at least one tab (e.g., tabs 38, 40 on the first side handle 34 and/or tabs 42, 44 on the second side handle 36) laterally offset from a center line 46 (FIG. 7) of the plunger 32 that engages and moves the plunger 32 when at least one of the first side handle 34 and the second side handle 36 is rotated. More specifically, the first and second handles 34, 36 are arranged so that rotation thereof moves the plunger 32 from its extended position to its retracted position.

In the illustrated embodiment, the at least one tab includes at least one first handle tab (e.g., tabs 38, 40) disposed on the first side handle 34 and at least one second handle tab (e.g., tabs 42, 44) disposed on the second side handle 36. The at least one first handle tab can be laterally offset a different dimension than the at least one second handle tab. For example, in the illustrated embodiment, the at least one first handle tab includes laterally spaced apart first handle tabs 38, 40 and the at least one second handle tab includes laterally spaced part second handle tabs 42, 44. The tabs 38 and 42 can be together disposed on one lateral side of the plunger 32 and the tabs 40, 44 can be together disposed on another, opposite lateral side of the plunger 32. The tab 38 can be laterally offset from the center line 46 of the plunger 32 a first lateral offset distance D1 and the tab 42 can be laterally offset from the center line 46 a second lateral offset distance D2 that is different (e.g., greater in the illustrated embodiment) than the first lateral offset distance. Similarly, the tab 44 can be laterally offset from the center line 46 of the plunger 32 a third lateral offset distance D3 and the tab 40 can be laterally offset from the center line 46 a fourth lateral offset distance D4 that is different (e.g., greater in the illustrated embodiment) than the third lateral offset distance D3. Also in the illustrated embodiment, the distance D1 can be the same as the distance D3 and the distance D2 can be the same as the distance D4, though this is not required.

Figure 4:
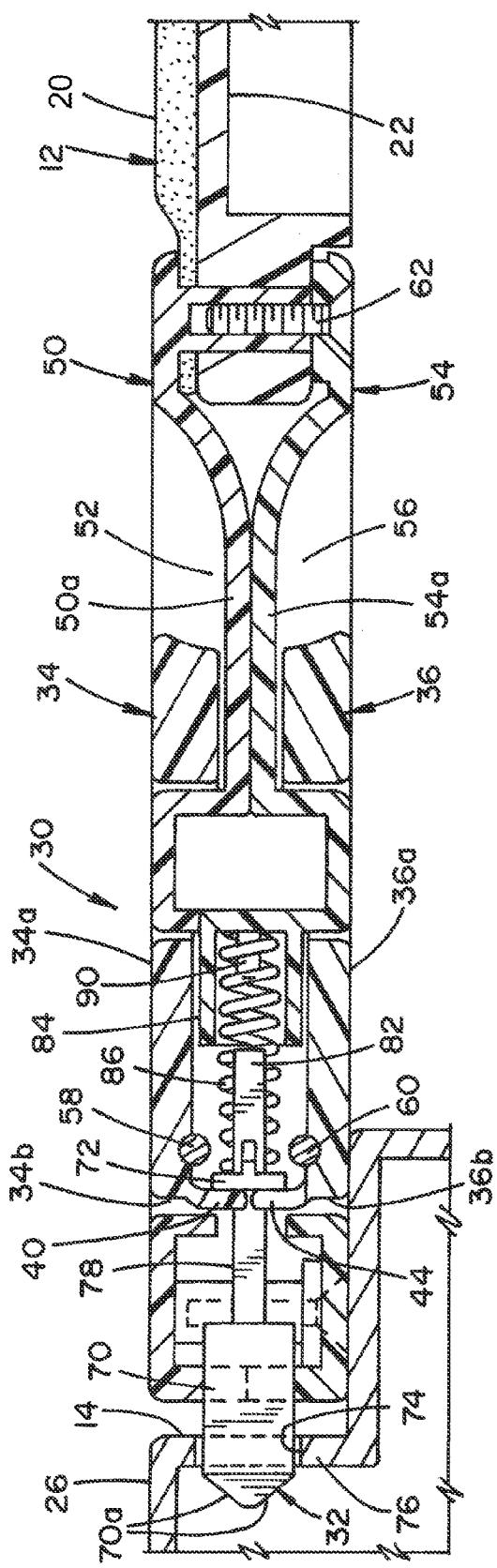
FIG. 4 is a cross-section view of the handle assembly taken along the line 4-4 of FIG. 3.

As shown, all of the tabs 38, 40, 42 and 44 are laterally offset relative to one another without any lateral overlap from one tab to another but all are longitudinally aligned. That is, the tabs 38, 40, 42 and 44 are generally collinearly aligned when the first and second side handles 34, 36 are in respective resting positions as shown in FIG. 4. Also shown in the illustrated embodiment, each of the first and second side handles 34, 36 includes one tab immediately adjacent the plunger 32 (e.g., the tab 38 on the first side handle 34 and the tab 44 on the second side handle 36) and one tab spaced farther apart from the plunger 32 (e.g., the tab 40 on the first side handle 34 and the tab 42 on the second side handle 36). Due to the laterally offsetting of the tabs 38-44, the tabs 38-44 can vertically overlap or can at least be closely spaced apart vertically to provide the handle assembly with a relatively reduced thickness illustrated as thickness T1 in FIG. 7.

Figure 6:
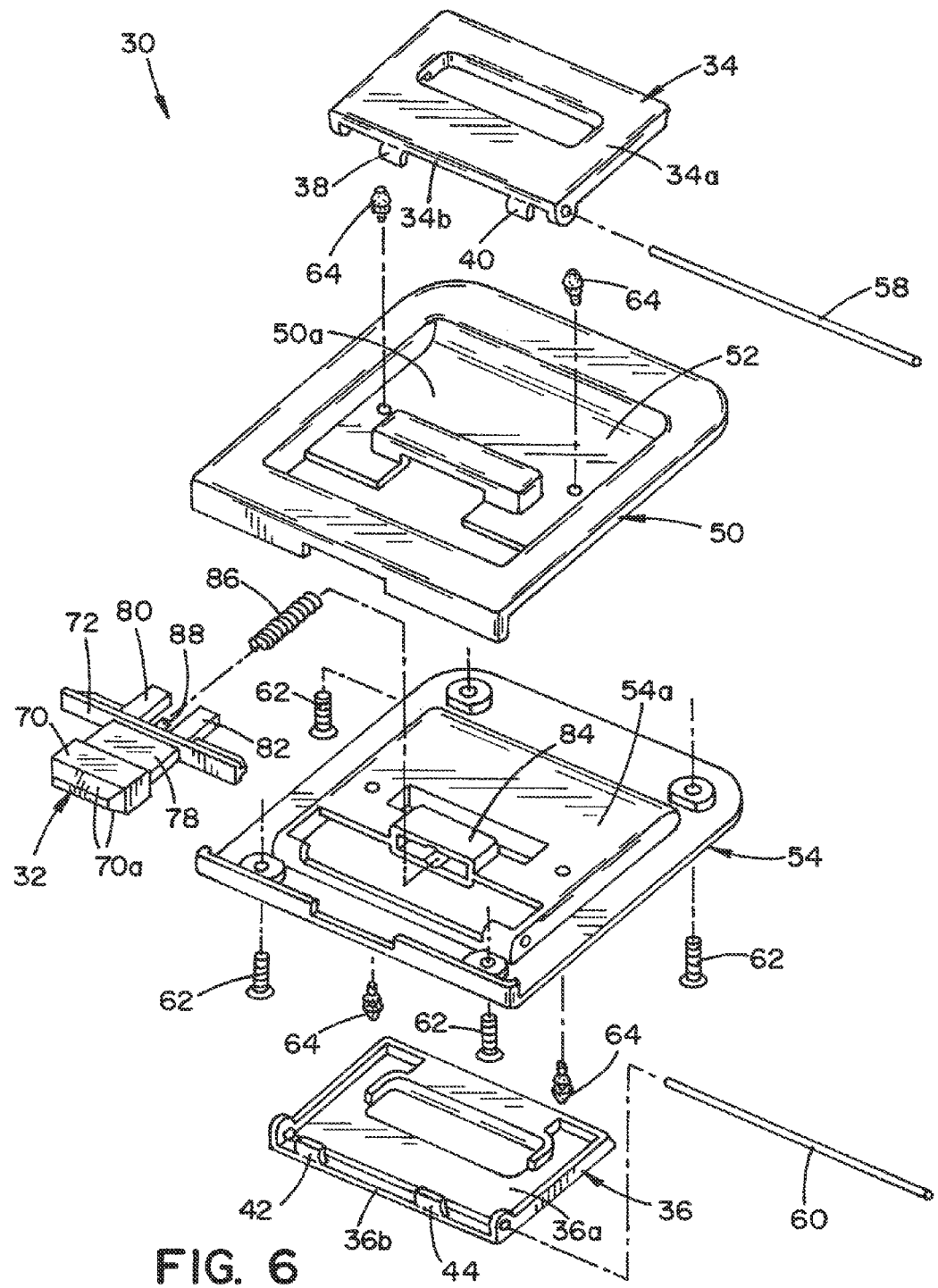
FIG. 6 is an exploded perspective view of the handle assembly shown in the preceding Figures.
Figure 7:
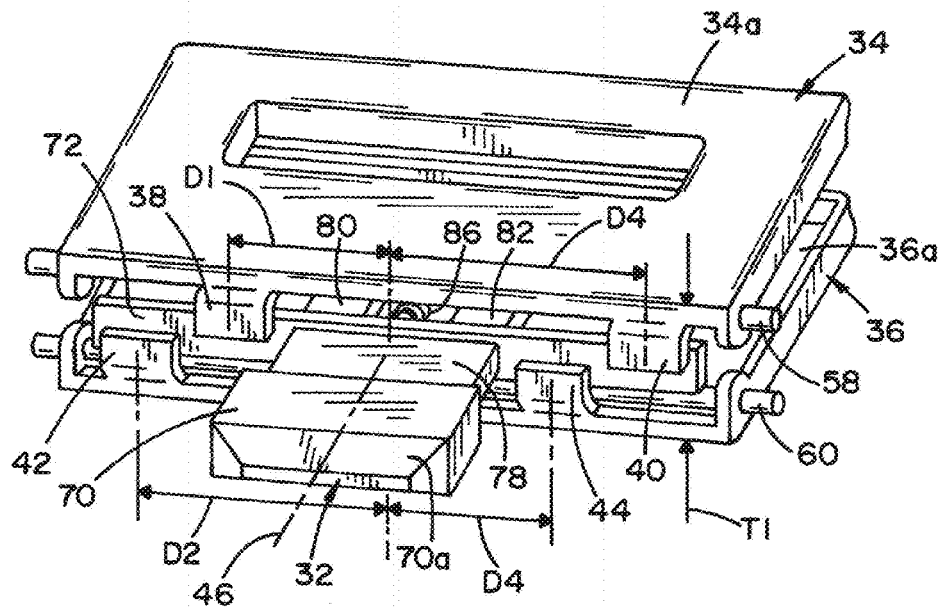
FIG. 7 is a perspective view of the handle assembly shown with first and second handle cases removed.

As best shown in FIG. 6, the first side handle 34 includes a first handle main body portion 34a and the tabs 38, 40 extending from the first handle main body portion 34a in generally orthogonal relation relative to the first handle main body portion 34a. Likewise, the second side handle 36 includes a second handle main body portion 36a and the tabs 42, 44 extend from the second handle main body portion 36a in generally orthogonal relation relative to the second handle main body portion 36a. Particularly, the tabs 38, 40 extend from or adjacent a forward side 34b of the first side handle 34 and likewise the tabs 42, 44 extend from a forward side 36b of the second side handle 36.

The handle assembly 30 further includes a first side handle case 50 defining a first side recess 52 in which the first side handle 34 is accommodated. Also, the handle assembly 30 includes a second side handle case 54 defining a second side recess 56 (see FIGS. 4 and 5) in which the second side handle 36 is accommodated. The first side handle 34 is pivotally mounted to the first side handle case 50 via a pivot pin 58. Likewise, the second side handle 36 is pivotally mounted to the second side handle case 54 via a pivot pin 60. The first and second side handle cases 50, 54 are secured together and attached to the cargo lid 12 via suitable fasteners, such as illustrated threaded fasteners 62. Resilient bumper members 64 can be disposed within the recesses 52, 56, respectively, for providing a resilient or softened engaging point of contact for the first and second side handles 34, 36. This can improve tactile feel of the handle assembly 30 and/or reduce unwanted noise during operation of the handle assembly 30 (i.e., noise causes by the handle 34 or 36 striking the respective handle case 50 or 54 is reduced or eliminated).

In the illustrated embodiment, the first and second side handle cases 50, 54 include, respectively, wall portions 50a, 54a that define the recesses 52, 56. That is, each of the first and second side handle cases 50, 54 includes a corresponding wall portion 50a or 54a. In an alternate embodiment (not shown), one of the wall portions 50a or 54a can be removed and the other of the wall portions 50a or 54a can function to define and separate both of the recesses 52, 56. That is, a single wall section 50a or 54a can be used to define the recesses 52, 56 with one side forming a surface defining the recess 52 and another, opposite side forming a surface defining the recess 56. This can advantageously provide more depth to the recesses 52, 56 and thereby facilitate ease of use for the handles 34, 36.

Figure 5:
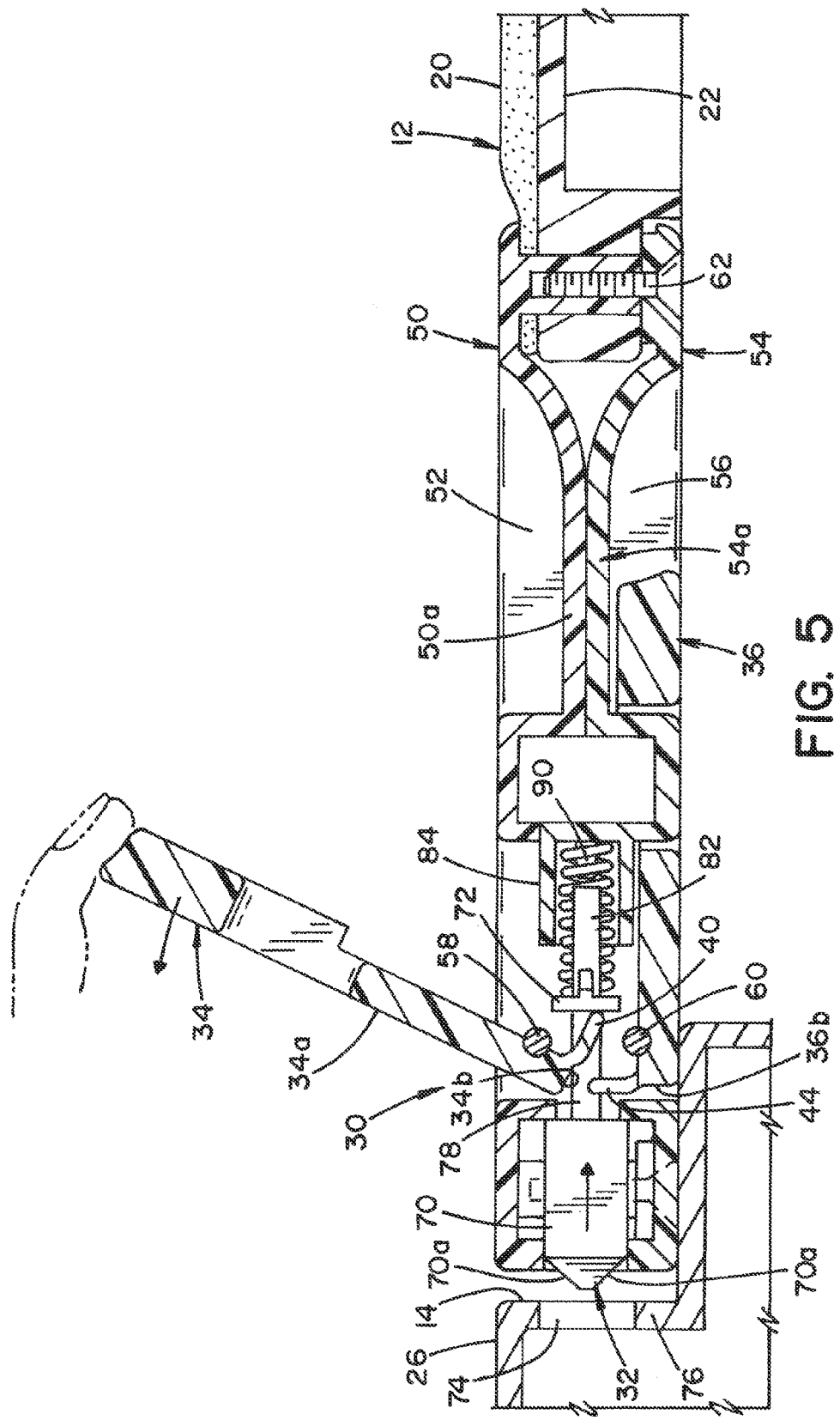
FIG. 5 is a cross-section view similar to FIG. 4 but showing a first side handle of the handle assembly being rotated to move a plunger of the handle assembly toward a retracted position.

The plunger 32 of the illustrated embodiment includes a forward engaging portion 70 that latches the plunger 32 when in the extended position and an engaging wall 72 flanking the forward engaging portion 70 and arranged to be engaged by and forcibly moved by the tabs 38, 40, 42, 44 when the first and second side handles 34, 46 are rotated, respectively. The forward engaging portion 70 is received in an aperture 74 defined in latching wall 76 depending from the floor 26 as best shown in FIGS. 4 and 5. When the forward engaging portion 70 is in the aperture 74, which corresponds to the plunger 32 being in the extended position, the cargo lid 12 is generally latched and secured within the floor aperture 14 and thus not removable (or at least not easily removable) from the floor aperture 14. The forward engaging portion 70 can include tapered surfaces 70a to facilitate easier insertion of the plunger 32 within the aperture 74. Additionally, and particular to the illustrated embodiment, the forward engaging portion 70 can be forwardly disposed in spaced relation from the engaging wall 72 by an extending portion 78. Guiding portions 80, 82 can extend rearward of the engaging wall 72 for receipt within guiding structure 84 disposed on the second side handle case 54. Receipt of the guided portions 80, 82 within the guiding structure 84 can facilitate guided movement of the plunger 32 between its extended position and its retracted position.

The plunger 32 can be urged toward its extended position and thus moved against such urging when either the first side handle 32 or the second side handle 34 is rotated. In particular, in the illustrated embodiment, the plunger 32 is spring bias via a spring 86 toward the extended position and rotation of the first side handle 34 or the second side handle 36 moves the plunger 32 against the spring bias (i.e., against the urging of the spring 86) toward the retracted position. The spring 86 can be disposed between and positioned on a spring holding portion 88 of the plunger 32 and a spring holding portion 90 of the second side handle case 54 and disposed within the guiding structure 84. By this arrangement, the plunger 32 is movably mounted to a body (i.e., the body formed of the first side handle case 50 and the second side handle case 54 in the illustrated embodiment) for movement between its extended position and its retracted position.

In operation, the cargo lid 12 can be received within the floor aperture 14 with the plunger 32 received in the aperture 74 to latch the cargo lid within the floor aperture 14. When desirable to unlatch the cargo lid 12, such as for removing the cargo lid 12 from the floor aperture 14 and optionally reversing the exposed side (first side 20 or second side 22) of the cargo lid 12, the upper facing handle (e.g., the first side handle 34 as shown in FIG. 5) can be rotated. Rotation of the first side handle 34 causes the tabs 38, 40 to forcibly engage the engaging wall 72 and move the plunger 32 toward its retracted position against the urging of the spring 86. This retracts the forward engaging portion 70 of the plunger 32 from the aperture 74 as shown in FIG. 5 so that the cargo lid 12 can be lifted out of the floor aperture 14. Optionally, the cargo lid 12 can be reinstalled in the floor aperture 14 with the second side 22 facing upward. Removal of the cargo lid 12 with the second side 22 facing upward would occur similarly in that the second side handle 36 would be rotated so that the tabs 42, 44 would forcibly engage the engaging wall 72 and move the plunger 32 toward its retracted position against the urging of the spring 86 to again allow the cargo lid 12 to be removed from the floor aperture 14.

Figure 8:
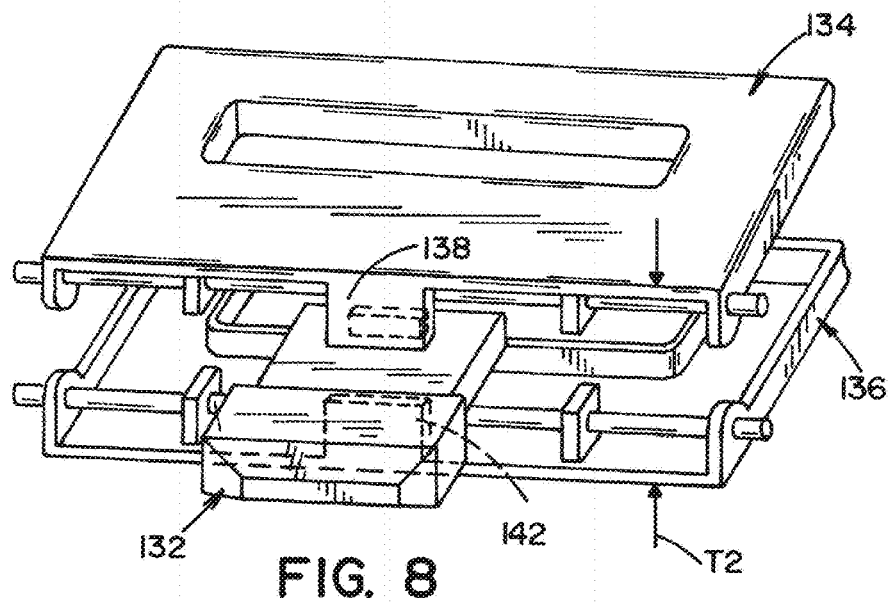
FIG. 8 is a perspective view of a known handle assembly shown with first and second handle cases removed.

Of particular advantage, having the tabs 38, 40, 42 and 44 laterally offset, both relative to the plunger 32 and relative to one another allows for the handle assembly 30 to be more compact. That is, the thickness T1 can be reduced. Generally, the thickness of the cargo lid 12 is determined by or corresponds to the thickness of the handle assembly so reducing the thickness T1 reduces an overall thickness of the vehicle cargo lid assembly 10. Additionally, the plunger 32 having the engaging wall 72 providing a large lateral contact surface in combination with the handle assembly 30 provisioning each handle 34 and 36 with two tabs (tabs 38, 40 on the first side handle 34 and tabs 42, 44 on the second side handle 36) provides a more robust assembly. For example, each of the side handles 34 and 36 will feel more tight and less sloppy during operation, particularly over the useful life of the side handles 34, 36. The foregoing advantages are in contrast to at least one known design depicted in FIG. 8. In the known design depicted in FIG. 8, handles 134, 136 include, respectively, tabs 138, 142 that are not laterally offset from plunger 132, nor offset from one another. This results in an increased thickness T2 as compared to the thickness T1 of the handle assembly 30 and a less robust assembly.

It will be appreciated that various of the above-disclosed features and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A cargo lid assembly for a vehicle, comprising:
a reversible vehicle cargo lid;
a plunger movably mounted to said reversible vehicle cargo lid for movement between an extended position for latching the vehicle cargo lid in a closed position and a retracted position for unlatching the vehicle cargo lid; and
a first side handle mounted on a first side of said reversible vehicle cargo lid and a second side handle mounted on a second, opposite side of said reversible vehicle cargo lid, wherein said first and second side handles are arranged so that rotation of either said first side handle or said second side handle moves said plunger from said extended position to said retracted position, at least one of said first side handle and said second side handle includes at least one tab laterally offset from a centerline of said plunger that engages and moves said plunger when said at least one of said first side handle and said second side handle is rotated, wherein said at least one tab includes at least one first handle tab disposed on said first side handle and laterally offset from said centerline in a first direction and at least one second handle tab disposed on said second side handle and laterally offset from said centerline in said first direction and laterally offset from the at least one first handle tab.

2. The cargo lid assembly of claim 1 wherein said first side handle includes a first handle main body portion and said at least one first handle tab extending from said first handle main body portion in generally orthogonal relation relative to said first handle main body portion, and wherein said second side handle includes a second handle main body portion and said at least one second handle tab extending from said second handle main body portion in generally orthogonal relation relative to said second handle main body portion.

3. The cargo lid assembly of claim 2 wherein said plunger includes:
a forward engaging portion that latches said plunger when in said extended position; and
an engaging wall having sides flanking said forward engaging portion and arranged to be engaged by and forcibly moved by said at least one first and second handle tabs when said first and second side handles are rotated, respectively.

4. The cargo lid assembly of claim 3 wherein said plunger is urged toward said extended position and is moved against said urging when said at least one of said first side handle and said second side handle is rotated.

5. The cargo lid assembly of claim 3 wherein said at least one first handle tab includes a pair of laterally spaced apart first handle tabs that engage said engaging wall on said sides thereof, and said at least one second handle tab includes a pair of laterally spaced apart second handle tabs that engage said engaging wall on said sides thereof.

6. The cargo lid assembly of claim 1 wherein said first side of said reversible vehicle cargo lid is formed of a first material and said second side of said reversible vehicle cargo lid is formed of a second material.

7. The cargo lid assembly of claim 6 wherein said first material is carpeting and said second material is plastic.

8. The cargo lid assembly of claim 1 wherein said at least one second handle tab is longitudinally aligned with said first handle tab.

9. The cargo lid assembly of claim 8 wherein said first handle tab is one of a plurality of laterally spaced apart first handle tabs and said second handle tab is one of a plurality of laterally spaced apart second handle tabs, said plurality of laterally spaced apart first handle tabs are laterally offset relative to said plurality of laterally spaced apart second handle tabs.

10. The cargo lid assembly of claim 1 further including:
a first side handle case defining a first side recess in which said first side handle is accommodated, said first side handle pivotally mounted to said first side handle case; and
a second side handle case defining a second side recess in which said second side handle is accommodated, said second side handle pivotally mounted to said second side handle case, wherein said first and second side handle cases are secured together and attached to said reversible vehicle cargo lid.

11. The cargo lid assembly of claim 1 wherein said reversible vehicle cargo lid is removably disposed in a floor aperture of the vehicle.

12. A vehicle cargo lid assembly, comprising:
a cargo lid disposed in a floor aperture on a vehicle, said cargo lid reversible and removable;
a plunger disposed on said cargo lid for securing said cargo lid within said floor aperture, said plunger movable between an extended position and a retracted position;
first and second side handles disposed, respectively, on first and second sides of said cargo lid, said first and second side handles arranged so that rotation of each side handle moves said plunger from said extended position to said retracted position, said first side handle having a first handle tab laterally offset from a centerline of said plunger in a first direction away from said plunger for reducing an overall thickness of the vehicle cargo lid assembly wherein said second side handle has a second handle tab laterally offset from said centerline of said plunger in said first direction away from said plunger and laterally offset from said first handle tab for reducing said overall thickness of the vehicle cargo lid assembly.

13. The vehicle cargo lid assembly of claim 12 wherein said first handle tab is one of a plurality of laterally spaced apart first handle tabs and said second handle tab is one of a plurality of laterally spaced apart second handle tabs, said first and second handle tabs each including one tab disposed on one lateral side of said plunger and another tab disposed on another, opposite side of said plunger.

14. The vehicle cargo lid assembly of claim 13 wherein said plurality of laterally spaced apart first handle tabs are longitudinally aligned with said plurality of laterally spaced apart second handle tabs.

15. The vehicle cargo lid assembly of claim 13 wherein said plurality of laterally spaced apart first handle tabs and said plurality of laterally spaced apart second handle tabs are generally collinearly aligned when said first and second side handles are in respective resting positions.

16. The vehicle cargo lid assembly of claim 12 wherein said plunger is spring biased toward said extended position and rotation of said first side handle or said second side handle moves said plunger against said spring bias toward said retracted position.

17. A handle assembly for a vehicle cargo lid, comprising:
a plunger movably mounted to a body for movement between an extended position and a retracted position;
a first side handle mounted to said body and arranged so that rotation of said first side handle moves said plunger from said extended position toward said retracted position;
a second side handle mounted to said body and arranged so that rotation of said second side handle moves said plunger from said extended position toward said retracted position;
at least one first handle tab disposed on the first side handle; and
at least one second handle tab disposed on the second side handle, the at least one second handle tab laterally offset from the at least one first handle tab, wherein the at least one first handle tab includes a pair of laterally spaced apart first handle tabs flanking the plunger and the at least one second handle tab includes a pair of laterally spaced apart second handle tabs flanking the plunger, each of the second handle tabs is laterally offset relative to each of the first handle tabs.

18. The handle assembly of claim 17 where the at least one first handle tab is laterally offset relative to a centerline of the plunger.

* * * * *